United States Patent
Ciccone

(10) Patent No.: US 7,271,555 B1
(45) Date of Patent: Sep. 18, 2007

(54) VEHICLE ELECTRICAL ASSIST APPARATUS AND KIT FOR SAME

(76) Inventor: Gabriel Ciccone, 53 Youngs Hill Rd., Huntington, NY (US) 11743

( * ) Notice: Subject to any disclaimer, the term of this patent is extended or adjusted under 35 U.S.C. 154(b) by 0 days.

(21) Appl. No.: 11/347,535

(22) Filed: Feb. 3, 2006

Related U.S. Application Data

(60) Provisional application No. 60/649,741, filed on Feb. 3, 2005.

(51) Int. Cl.
*H02P 3/00* (2006.01)

(52) U.S. Cl. .................. 318/139; 180/65.1; 180/65.3; 180/247; 701/22

(58) Field of Classification Search ............... 180/65, 180/65.1, 65.3; 318/139; 701/22
See application file for complete search history.

(56) References Cited

U.S. PATENT DOCUMENTS

| | | |
|---|---|---|
| 707,230 A | 8/1902 | Henry |
| 799,851 A | 9/1905 | Hood |
| 1,824,014 A | 9/1931 | Froelich |
| 3,205,965 A | 9/1965 | Roth ................... 180/65 |
| 3,367,438 A | 2/1968 | Moore ................. 180/65 |
| 3,888,325 A | 6/1975 | Reinbeck ............ 180/65 A |
| 4,405,029 A | 9/1983 | Hunt .................. 180/65 A |
| 5,193,634 A | 3/1993 | Masut ................. 180/65.2 |
| 5,847,470 A * | 12/1998 | Mitchell .................. 290/45 |
| 6,040,634 A * | 3/2000 | Larguier ................. 290/45 |
| 6,044,922 A * | 4/2000 | Field ................... 180/65.2 |
| 6,107,761 A * | 8/2000 | Seto et al. ............. 318/139 |
| 6,563,230 B2 * | 5/2003 | Nada .................. 290/40 C |
| 6,679,796 B2 * | 1/2004 | Sugano ................. 474/28 |
| 6,757,599 B2 * | 6/2004 | Nada ..................... 701/29 |
| 6,784,563 B2 * | 8/2004 | Nada .................. 290/40 C |
| 7,099,757 B2 * | 8/2006 | Niki et al. .............. 701/22 |

FOREIGN PATENT DOCUMENTS

| | | |
|---|---|---|
| EP | 0510582 A2 | 10/1992 |
| GB | 2196912 | 5/1988 |

* cited by examiner

*Primary Examiner*—Rita Leykin
(74) *Attorney, Agent, or Firm*—David Aker

(57) ABSTRACT

Apparatus for installation in new motor vehicles or for retrofitting into existing motor vehicles, including an electric motor coupled to a drive shaft and a controller for the motor. The existing vehicle battery and/or an auxiliary storage battery can be used to power the motor to drive the vehicle during certain driving conditions, resulting in greatly increased fuel economy, without interfering with the normal performance of the vehicle. A kit of parts may be provided for simple and economical installation on existing vehicles. A motor vehicle so equipped.

19 Claims, 2 Drawing Sheets

VEHICLE ELECTRICAL ASSIST APPARATUS AND KIT FOR SAME

This application claims priority, under 35 U.S.C. §119(e), from U.S. provisional application Ser. No. 60/649,741 filed on Feb. 3, 2005; and the entire teachings of that application is hereby incorporated by reference, in its entirety. Reference is also made to Disclosure Document 560652 filed with the United States Patent and Trademark Office on Sep. 15, 2004. It is requested that Disclosure Document 560652 be transferred into the file of the present application.

BACKGROUND OF THE INVENTION

1. Field of the Invention

The present invention relates to apparatus for increasing the mileage of motor vehicles. More particularly, it relates to those apparatus that utilize electrical energy storage and an electrical motor to lower overall energy consumption of a motor vehicle.

2. Background Art

As the cost of hydrocarbon fuels, and in particular the cost of gasoline and diesel fuel have increased, there it has become increasingly desirable to develop technologies that decrease fuel consumption. Generally, there have been a variety of technologies that have been developed that result in incremental increases in efficiencies of internal combustion engines. There has also been a trend to settle for decreased performance in terms of acceleration capability and gross weight handling capability, in order to increase mileage. However, experience has shown that many consumers are generally reluctant to give up performance and to drastically reduce carrying capacity in order to save on energy costs.

A technology that has been developed that seems to have some promise is that of hybrid vehicles; that is those using a combination of electric and internal combustion engines. Significant increases in mileage have been achieved. However, these vehicles tend to be small, sometime have limited range when operating on the electric motors, and demand a premium in cost. Further, it is necessary to replace the batteries during the life of the vehicle, thus further increasing cost. This has limited the desirability of such vehicles to owners who are willing to make sacrifices in performance and load handling capability, and do enough driving to justify the increase cost, even after tax advantages that may be associated with the purchase of such motor vehicles.

Another difficulty with such prior art technologies is that they are not applicable to the existing vehicles that are already on the road. In other words, increasing fuel economy generally means the need to purchase a new vehicle. There are many vehicle owners who would be very pleased to have a technology to boost fuel economy, but who have functional vehicles, and are not yet ready to go to the considerable expense of purchasing a new vehicle.

SUMMARY OF THE INVENTION

It is an object of the invention to provide an electrical assist apparatus for a motor vehicle that increases fuel economy during selected driving conditions, without decreasing performance.

It is a further object of the invention to provide an apparatus that can be used on new vehicles or can be economically retrofitted onto existing vehicles at minimal expense.

It is another object of the invention to provide an apparatus that does not interfere with the normal performance, functioning and design of a motor vehicle, while meeting the objects stated above.

These objects and others are achieved in accordance with the invention by apparatus for installation in new motor vehicles or for retrofitting into existing motor vehicles, including an electric motor coupled to a drive shaft and a controller for the motor. The existing vehicle battery and/or an auxiliary storage battery can be used to power the motor to drive the vehicle during certain driving conditions, resulting in greatly increased fuel economy, without interfering with the normal performance of the vehicle. A kit of parts may be provided for simple and economical installation on existing vehicles. The invention is also directed to a motor vehicle so equipped, and to a method of operating a motor vehicle so equipped.

Thus, the invention is directed to apparatus for installation in new motor vehicles or for retrofitting into an existing motor vehicle, comprising an electric motor coupled to a drive shaft or drive axle of the vehicle; a controller for the motor; and a first belt or a first drive chain for coupling said motor to one of said drive shaft or drive axle of the vehicle. The apparatus may further comprise an additional belt or drive chain coupled to the drive shaft or drive axle and extending in a direction opposite to that of said first belt or first drive chain; and an idler gear for engaging said additional belt or drive chain. At least one of an existing vehicle battery and an auxiliary storage battery is used to power the motor to drive the vehicle during predetermined driving conditions. The controller may comprise means for disengaging power to said motor in response to operation of a brake pedal, provision of electrical energy to a reverse light, and shifting a transmission of said vehicle into a park position.

Preferably the apparatus further comprises a sensor for determining rotational speed of said motor operatively connected to said motor, and the controller comprises means for disengaging power to said motor in response to an output of said sensor indicating said motor is rotating at greater than a predetermined speed.

Operation of said apparatus increases fuel economy of the vehicle, without interfering with the normal performance of the vehicle. The apparatus can be provided as a kit of parts for installation on a vehicle. The kit of parts can be used for retrofitting on an existing vehicle.

The invention is also directed to apparatus for retrofitting into an existing motor vehicle, comprising an electric motor coupled to a drive shaft or drive axle of the vehicle; and a controller for the motor. The apparatus may further comprise a first belt or a first drive chain for coupling said motor to one of said drive shaft or drive axle of the vehicle. An additional belt or drive chain may be coupled to the drive shaft or drive axle and extend in a direction opposite to that of the first belt or first drive chain. An idler gear can engage the additional belt or drive chain.

At least one of an existing vehicle battery and an auxiliary storage battery can be used to power the motor to drive the vehicle during certain driving conditions.

The controller can comprise means for disengaging power to said motor in response to operation of a brake pedal, provision of electrical energy to a reverse light, and shifting a transmission of said vehicle into a park position.

The apparatus may further comprise a sensor for determining rotational speed of said motor operatively connected to said motor, wherein said controller comprises means for disengaging power to said motor in response to an output of said sensor indicating said motor is rotating at greater than a predetermined speed.

The invention is also directed to a method for controlling a vehicle equipped with any of the apparatus described above, comprising using the apparatus to accelerate the vehicle for a predetermined time, to a predetermined speed or until other motive means are used.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT

Figure 1:
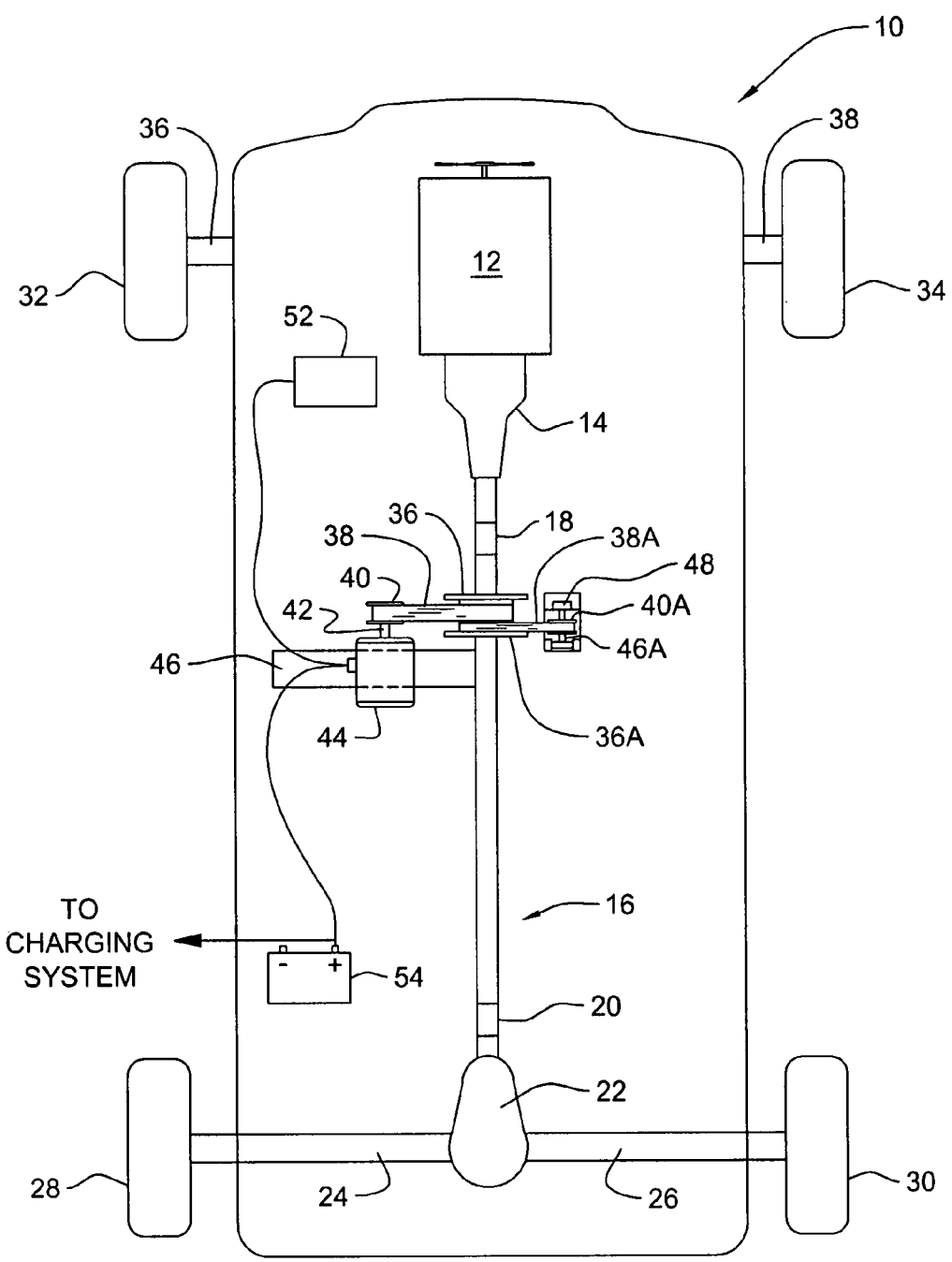
FIG. 1 is a somewhat schematic bottom view of a motor vehicle equipped with an apparatus in accordance with the invention.

Referring to FIG. 1, there is shown a bottom view of a motor vehicle 10 incorporating features of the present invention. Although the present invention will be described with reference to the embodiments shown in the drawings, it should be understood that the present invention can be embodied in many alternate forms of embodiments. In addition, any suitable size, shape or type of elements or materials could be used.

Motor vehicle 10 may be any of several types of vehicles such as a simple automobile or car, a sports utility vehicle, or a truck. Vehicle 10 may be configured with a conventional internal combustion engine 12, a transmission 14, and a drive shaft assembly 16 that is caused to rotate by the transmission. Drive shaft assembly 16 may have universal joints 18 and 20 along its length, as is well known in the art. The end of drive shaft assembly 16 remote from transmission 14 is connected to a differential gear assembly 22, which serves to rotate drive shafts within axle assemblies 24 and 26 to rotate respective wheels 28 and 30. Another set of wheels 32 and 34 are mounted on additional axles 36 and 38, as is also well know in the art.

Figure 2:
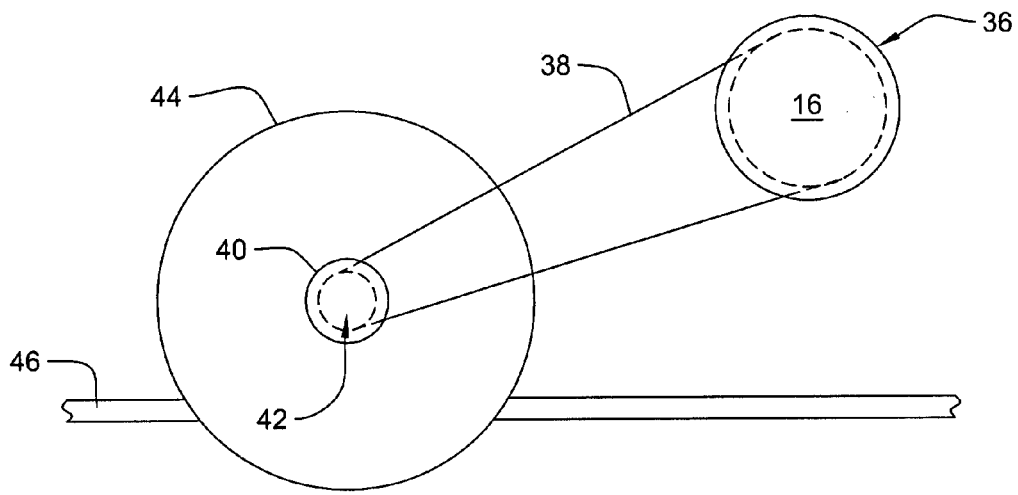
FIG. 2 is partial view of a portion of the vehicle of FIG. 1.

Referring to FIG. 1 and FIG. 2, in accordance with the invention, a central portion of drive shaft assembly 16 has mounted thereon a pulley or gear 36. Gear 36 engages an endless drive chain 38 (or endless belt in the case of a pulley) which also engages a gear 40 on the shaft 42 of an electric motor 44. Gear 36, chain 38, gear 40 and motor 44, may be assembled to a new vehicle 10, or may be added to an existing vehicle, along with other components, as described below, to allow use during selected driving conditions, to conserve fuel used by internal combustion engine 12. Electric motor 44 may be mounted on a suitable bracket 46, which may be secured to the underside of vehicle 10 by welding or by bolting through suitable holes, in any well known manner.

There may be some applications where lateral forces produced by chain 38 (or a belt) are excessive, and may lead to some mechanical difficulties for drive shaft assembly 16. To balance such forces, an additional gear 36A (or pulley) may be mounted on drive shaft assembly 16 in close proximity to gear 36, and an endless chain 38A may be looped around an idler gear 40A on a shaft 46A. Shaft 46A may be supported in suitable bearings of a bracket assembly 48, welded or bolted to the underside of vehicle 10. This type of arrangement will balance forces on drive shaft assembly 10.

In general, the gear(s) or pulley(s) used should be mounted on the driveshaft assembly 16 as close as possible to the transmission 14. A gear or pulley should extend in the direction of the axis of the driveshaft assembly 16 for a distance of up to 2.5 inches (6.4 cm) to allow for movement of the driveshaft assembly. The drive belt or chain assembly or assemblies that engages the gear or pulley may be up to 1.5 inches (3.8 cm) wide. Gears on the shaft of the electric motor are dimensioned to accept such chain or pulley, and are sized to provide a speed reduction ratio of approximately 5:1 to 6:1.

Electric motor 44 is supplied with operating current by one or more batteries. A first battery 52 may be the usual lead-acid storage battery that provides power for a starting motor (not shown) for internal combustion engine 12, which is conventionally located in the engine compartment of vehicle 10. A second battery may be an auxiliary gel battery 54 located in the vehicle 10 at a place other than the engine compartment, as for example in the trunk of the vehicle. However, it is preferable that the existing battery be upgraded to a high output gel cell. In some circumstances, especially for heavier vehicles, the second gel cell placed in the trunk of the vehicle should be a high output gel cell. Preferably, the alternator used in the vehicle should have an output of 100 amperes or more, achieved by replacement of the alternator, if necessary.

An example of an electric motor 44 that may be used for smaller vehicle applications is a 600 watt, ¾ horsepower, brushless motor, such as item number MOT-BMC24600. This type of motor is often used to upgrade power capabilities on electric bicycles and is configured with a three-hole bolt receiving mounting pattern and a D shaft. Advantageously, this motor may be configured with a freewheeling planetary speed reducer, such as item SPR-2519R, which allows the motor to idle, or to turn at a rate lower than the drive shaft. This device comes into play when drive power from the motor is not needed, such as when the internal combustion engine is supplying drive power, or when gravity is accelerating the vehicle down a hill. Electrical connections are made to the motor with a dual 2 prong connector such as item CHX-2PX2. These items are available from ElectricScooterParts.com of Boulder Creek, Calif. Other motors, having higher power ratings, such as at least 1.5 horsepower (approximately 1,100 watts), are preferred in most applications, including those involving larger vehicles.

Although not shown, it will be understood that motor 44 may be equipped with a lock-up converter or planetary or clutch assembly to engage and disengage from drive functions. In addition, motor 44 may be used as a generator to provide some assistance in slowing the vehicle by the use of dynamic braking, thus adding to the charge in the batteries.

Figure 3:
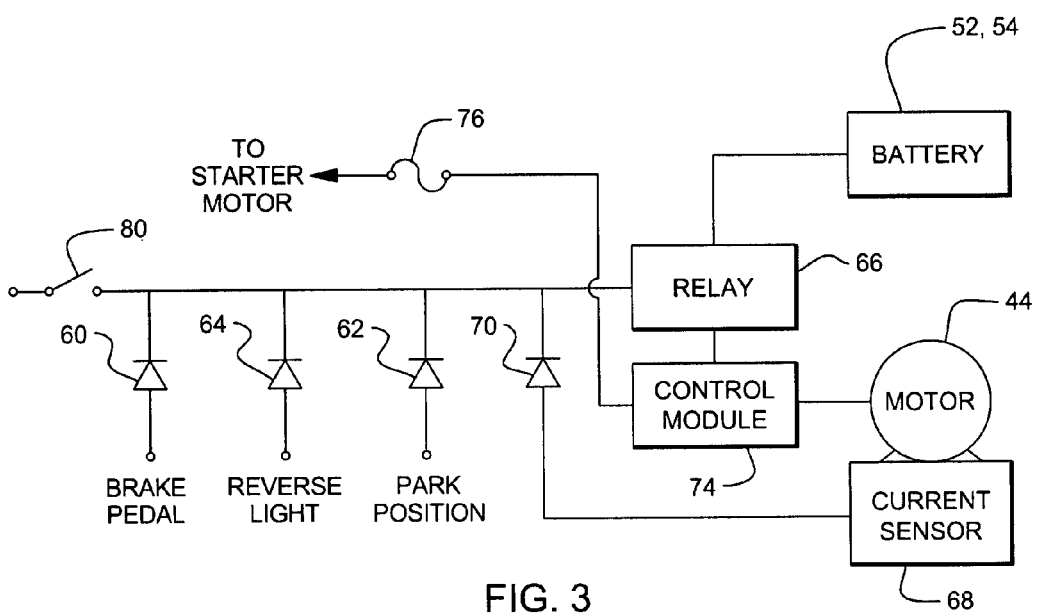
FIG. 3 is a schematic diagram of a control circuit for an embodiment of the invention, such as that illustrated in FIG. 1 and FIG. 2.

FIG. 3 illustrates an embodiment of a control circuit wherein the position of the brake pedal controls motor 44. Pressing down on the brake pedal, shifting the vehicle into park, or shifting the vehicle into reverse all result in supplying a current through one of respective diodes 60, 62 and 64 to operate a relay 66, which, by means of a programmable control module 74, disconnects power to the motor 44. If the brake pedal is not pressed down, and the vehicle in not in park or reverse, power is supplied to motor 44 for a period of 20 seconds, or until a sensor indicates that the vehicle has reached a predetermined speed, such as for example, a speed of 20 miles per hour (32 Km/hr). In addition, if there is no significant mechanical load on the motor, such as when the vehicle's gas pedal had been pressed, and internal combustion engine 12 is supplying drive power, a decrease in the current demand of motor 44 is detected by a sensor 68 (which may be located within motor 44). An output of sensor 68 activates relay 66 by means of current supplied by a diode 70, to cut off power from the battery to motor 44.

Relay 66 provides a control input to the programmable control module 74, which in turn provides power to motor 44. An eighty ampere (or higher current, as may be appropriate) fuse 76 wired to the starter motor may be used to supply current for motor 44 via control module 74. Current is supplied from auxiliary battery 54 via a fuse, (not shown) similar or identical to fuse 76, in a similar manner. The control module 74 may be a type Rad2Go E10 controller, supplied by ElectricScooterParts.com of Boulder Creek, Calif. Two modules 74 may be wired in parallel to handle the required current. An override switch 80, may be used to provide a potential, via a diode 82, to shut off operation of the electrical assist system in accordance with the invention.

Thus, the present invention provides an electric assist to a vehicle having an internal combustion engine. The electric assist function is most useful under mixed or congested driving conditions, where the amount of fuel used by the internal combustion engine may be greatly reduced. On the other hand, when open road conditions present themselves, the assist feature is turned off, and the efficiency and power of the internal combustion engine at higher speeds, and its ability to provide better acceleration, may be exploited. This provides a vehicle with increased fuel economy and desirable driving characteristics.

Another advantage of the invention is in cases where the vehicle operator makes the mistake of permitting the fuel for the internal combustion engine to be exhausted in a region where additional fuel is not available or where there is an unexpected mechanical breakdown. There is some inherent driving distance provided by the energy stored in the one or more batteries on board the vehicle.

This may, under certain circumstances, permit the operator to drive the vehicle, at reduced speed, to a source of fuel, or at least to position the vehicle in a relatively safe location.

The invention may be installed on new vehicles, or may be provided as a kit of parts for installation or retrofitting on an existing vehicle. The invention is directed to the apparatus, the method and apparatus for its control, and to a vehicle so having such apparatus.

While the embodiment of the invention has been described with respect to a vehicle having a drive shaft extending to its rear wheels, with suitable modifications, it can be adapted to front wheel drive axles. Thus, the invention can be used for front wheel drive, rear wheel drive and four wheel drive vehicles.

It should be understood that the foregoing description is only illustrative of the invention. Various alternatives and modifications can be devised by those skilled in the art without departing from the invention. Accordingly, the present invention is intended to embrace all such alternatives, modifications and variances, including those falling within the scope of the attached claims.

What is claimed is:

1. Apparatus for installation in new motor vehicles or for retrofitting into an existing motor vehicle, comprising:
   an electric motor coupled to a drive shaft or drive axle of the vehicle;
   a controller for the motor;
   a first belt or a first drive chain for coupling said motor to one of said drive shaft or drive axle of the vehicle; and
   a sensor for determining rotational speed of said motor operatively connected to said motor, wherein said controller comprises means for disengaging power to said motor in response to an output of said sensor indicating said motor is rotating at greater than a predetermined speed.

2. The apparatus of claim 1, further comprising:
   an additional belt or drive chain coupled to the drive shaft or drive axle and extending in a direction opposite to that of said first belt or first drive chain; and
   an idler gear for engaging said additional belt or drive chain.

3. The apparatus of claim 1, wherein at least one of an existing vehicle battery and an auxiliary storage battery is used to power the motor to drive the vehicle during predetermined driving conditions.

4. The apparatus of claim 1, wherein said controller comprises means for disengaging power to said motor in response to operation of a brake pedal, provision of electrical energy to a reverse light, and shifting a transmission of said vehicle into a park position.

5. The apparatus of claim 1, wherein operation of said apparatus increases fuel economy of the vehicle, without interfering with the normal performance of the vehicle.

6. The apparatus of claim 1, provided as a kit of parts for installation on a vehicle.

7. The apparatus of claim 6, wherein the kit of parts is for retrofitting on an existing vehicle.

8. Apparatus for retrofitting into an existing motor vehicle, comprising:
   an electric motor coupled to a drive shaft or drive axle of the vehicle;
   a controller for the motor; and
   a sensor for determining rotational speed of said motor operatively connected to said motor, wherein said controller comprises means for disengaging power to said motor in response to an output of said sensor indicating said motor is rotating at greater than a predetermined speed.

9. The apparatus of claim 8, further comprising a first belt or a first drive chain for coupling said motor to one of said drive shaft or drive axle of the vehicle.

10. The apparatus of claim 8, further comprising:
    an additional belt or drive chain coupled to the drive shaft or drive axle and extending in a direction opposite to that of said first belt or first drive chain; and
    an idler gear for engaging said additional belt or drive chain.

11. The apparatus of claim 7, wherein at least one of an existing vehicle battery and an auxiliary storage battery are used to power the motor to drive the vehicle during certain driving conditions.

12. The apparatus of claim 8, wherein said controller comprises means for disengaging power to said motor in response to operation of a brake pedal, provision of electrical energy to a reverse light, and shifting a transmission of said vehicle into a park position.

13. The apparatus of claim 8, wherein operation of said apparatus increases fuel economy of the vehicle, without interfering with the normal performance of the vehicle.

14. The apparatus of claim 8, provided as a kit of parts for installation on a vehicle.

15. A motor vehicle equipped with the apparatus of claim 1.

16. A motor vehicle equipped with the apparatus of claim 8.

17. A method for controlling a vehicle equipped with the apparatus of claim 1, comprising using the apparatus to accelerate the vehicle for a predetermined time, to a predetermined speed or until other motive means are used.

18. A method for controlling a vehicle equipped with the apparatus of claim 8, comprising using the apparatus to accelerate the vehicle for a predetermined time, to a predetermined speed or until other motive means are used.

19. Apparatus for installation in new motor vehicles or for retrofitting into an existing motor vehicle, comprising:

an electric motor coupled to a drive shaft or drive axle of the vehicle;

a controller for the motor;

a first belt or a first drive chain for coupling said motor to one of said drive shaft or drive axle of the vehicle;

an additional belt or drive chain coupled to the drive shaft or drive axle and extending in a direction opposite to that of said first belt or first drive chain; and an idler gear for engaging said additional belt or drive chain.

* * * * *